US012694211B2

(12) United States Patent
Butvinik

(10) Patent No.: US 12,694,211 B2
(45) Date of Patent: Jul. 28, 2026

(54) SYSTEM AND METHOD FOR INTELLIGENT EVALUATION OF ARTIFICIAL INTELLIGENCE GENERATED TEXTS

(71) Applicant: Actimize Ltd., Ra'anana (IL)

(72) Inventor: Danny Butvinik, Haifa (IL)

(73) Assignee: Actimize Ltd. (IL)

( * ) Notice: Subject to any disclaimer, the term of this patent is extended or adjusted under 35 U.S.C. 154(b) by 87 days.

(21) Appl. No.: 18/645,563

(22) Filed: Apr. 25, 2024

(65) Prior Publication Data

US 2025/0335710 A1    Oct. 30, 2025

(51) Int. Cl.
   *G06F 40/284*      (2020.01)
   *G06F 40/30*       (2020.01)
(52) U.S. Cl.
   CPC ............ G06F 40/284 (2020.01); G06F 40/30 (2020.01)
(58) Field of Classification Search
   CPC .............................. G06F 40/284; G06F 40/30
   See application file for complete search history.

(56) References Cited

U.S. PATENT DOCUMENTS

| | | | | |
|---|---|---|---|---|
| 10,978,056 B1 * | 4/2021 | Challa | ................. | G06F 16/3344 |
| 11,157,693 B2 * | 10/2021 | Srinivasan | ............ | G06F 40/166 |
| 11,488,579 B2 * | 11/2022 | Wick | ........................ | G06N 3/08 |
| 2021/0097242 A1 * | 4/2021 | Yoon | ........................ | G06F 40/44 |
| 2024/0362417 A1 * | 10/2024 | Imani | ........................ | G06N 3/09 |
| 2025/0259065 A1 * | 8/2025 | Mukherjee | ........... | G06N 3/0895 |

* cited by examiner

*Primary Examiner* — Eric Yen

(57)            ABSTRACT

A system and method for automatically evaluating computer generated content may include: calculating a plurality of metrics for an input text, where the plurality of metrics may include one or more perplexity scores describing a prediction of the input text by a large language model (LLM); determining, based on one or more of the calculated metrics, whether to accept or reject the input text; and performing an exchange of data between remotely connected computer devices based on the determining to accept or reject the text. In some embodiments, calculating of metrics and determining whether to accept or reject the input text may be performed without relying on any information received subsequent to the initial receiving of the input text. Some embodiments may perform automated computerized actions such as, e.g., deploy or discard an update to the LLM based on the determining whether to accept or reject the input text.

20 Claims, 10 Drawing Sheets

---

Step 810: calculate metrics for an input text (including perplexity scores describing a prediction of the text by a large language model)

↓

Step 820: determine, based on the calculated metrics, whether to accept/reject the input text

↓

Step 830: perform an exchange of data between remotely connected computer devices based on the determining to accept or reject the text

| Metric | Score Range | Score Interpretation | Description/Purpose |
|---|---|---|---|
| Perplexity | $[1, +\infty)$ | Lower is generally better | Measures how well a probability model predicts a sample. Lower perplexity indicates better prediction. |
| Conditional Perplexity | $[1, +\infty)$ | Lower is generally better | Like perplexity but conditioned on some prior information. Lower values indicate better conditional prediction. |
| Document Perplexity | $[1, +\infty)$ | Lower is generally better | Assesses perplexity over an entire document, evaluating the model's performance on larger text structures. |
| Self-BLEU | $[0, 1]$ | Lower is generally better | Measures the degree of overlap between different parts of the text; used to assess diversity. Lower scores indicate more diversity. |
| Distinctness | $[0, 1]$ | Higher is generally better | Evaluates the diversity of the vocabulary used in the text. Higher scores indicate greater lexical diversity. |
| Consistency | $[0, 1]$ | Higher is generally better | Assesses the logical and thematic consistency within the text. Higher scores indicate more consistent content. |
| Fluency | $[1, 10]$ | Subjective; based on fluency range | Gauges how naturally the text flows, including grammar and style. Typically assessed qualitatively. |
| Semantic Similarity | $[0, 1]$ or $[0, 100]$ | Higher is generally better; depends on the scale | Measures how semantically close the generated text is to a reference or set of references. |
| Emotional Tone | $[0, 1]$ | Higher values indicate a more positive tone | Assesses the emotional valence of the text. Higher scores often reflect more positive sentiment. |
| Lexical Complexity | $[0, 1]$ | Higher complexity score indicates advanced vocabulary | Evaluates the complexity of vocabulary used in the text. Higher scores indicate more advanced or varied word usage. |
| Kirsch-Kincaid Readability | Typically $[0, +\infty)$ | Lower scores indicate easier readability | Provides an estimate of the reading level required to understand the text. Used to assess text complexity. |
| Entity Consistency | $[0, 1]$ | Higher score indicates more uniform mention of entities | Evaluates how consistently entities are mentioned or used throughout the text. Higher scores suggest better consistency in entity usage. |

FIG. 3

| Metric | Score | Interpretation |
|---|---|---|
| Perplexity | 17.57 | Low perplexity, indicating fluent and coherent text. |
| Conditional Perplexity | 2.99 | Low conditional perplexity, indicating coherent and fluent generated text. |
| Document Perplexity | 17.57 | Low perplexity, indicating fluent and coherent text. |
| Self-BLEU | 0.1275 | Low Self-BLEU, indicating higher diversity and less repetition in the generated sentences. |
| Distinctness | 0.4748 | Moderate distinctness, suggesting some diversity in the generated text. |
| Consistency | 0.9990 | High consistency, indicating stable and similar outputs for the same prompt. |
| Fluency | High fluency, indicating that the generated text is fluent and well-formed. | Fluency Range: [1, 50] - Lower perplexity values are better. |
| Semantic Similarity | 1.00 | High semantic similarity, indicating closely related content. |
| Emotional Tone | 0.8462 | Predominantly positive emotional tone. |
| Lexical Complexity | 0.5804 | Moderate lexical complexity. |
| Kirsch-Kincaid Readability | 16.10 | Very difficult to read. Suitable for advanced degree graduates. |
| Entity Consistency | 0.0500 | Low entity consistency, indicating varied mention of entities. |

| Sentence | Perplexity Score |
|---|---|
| In the bustling city of Prospera, where fortunes were made and lost with each tick of the clock, a dance of coins unfolded daily among the entities and parties in the financial landscape | 103.09856414794922 |
| Let us delve into the intriguing narrative of three characters whose paths intertwined through a series of compelling financial transactions | 96.77794647216797 |
| In this tale, we have Emily, a brilliant entrepreneur with a vision to revolutionize the renewable energy sector | 35.71305084228156 |
| She founded a promising startup called "EcoSpark Technologies" and sought to raise capital to bring her innovative solar energy solution to life | 67.62751770019531 |
| Armed with a comprehensive business plan, Emily approached venture capitalist firm "Vertex Ventures" in search of funding | 106.10667419433594 |
| Impressed by the audacious ambition and the potential for high returns, the partners at Vertex Ventures, led by Mr | 71.51570129394531 |
| Alexander Whitman, agreed to invest $2 million in exchange for a 20% equity stake in EcoSpark Technologies | 54.22725296020508 |
| This transaction was a defining moment for Emily and her team | 89.64849090576172 |
| With the newfound capital infusion, they accelerated product development, expanded their market reach, and eventually secured a lucrative contract with a major utility company | 55.38743591308594 |
| The value of EcoSpark Technologies surged, rewarding Vertex Ventures with substantial returns on their investment | 224.88386534564453 |
| On the other side of the financial spectrum was Benjamin, a seasoned and shrewd investor | 45.84286880493164 |
| Known for his uncanny ability to spot lucrative investment opportunities, Benjamin had been watching EcoSpark Technologies' rise with keen interest | 131.43580627441406 |

FIG. 4

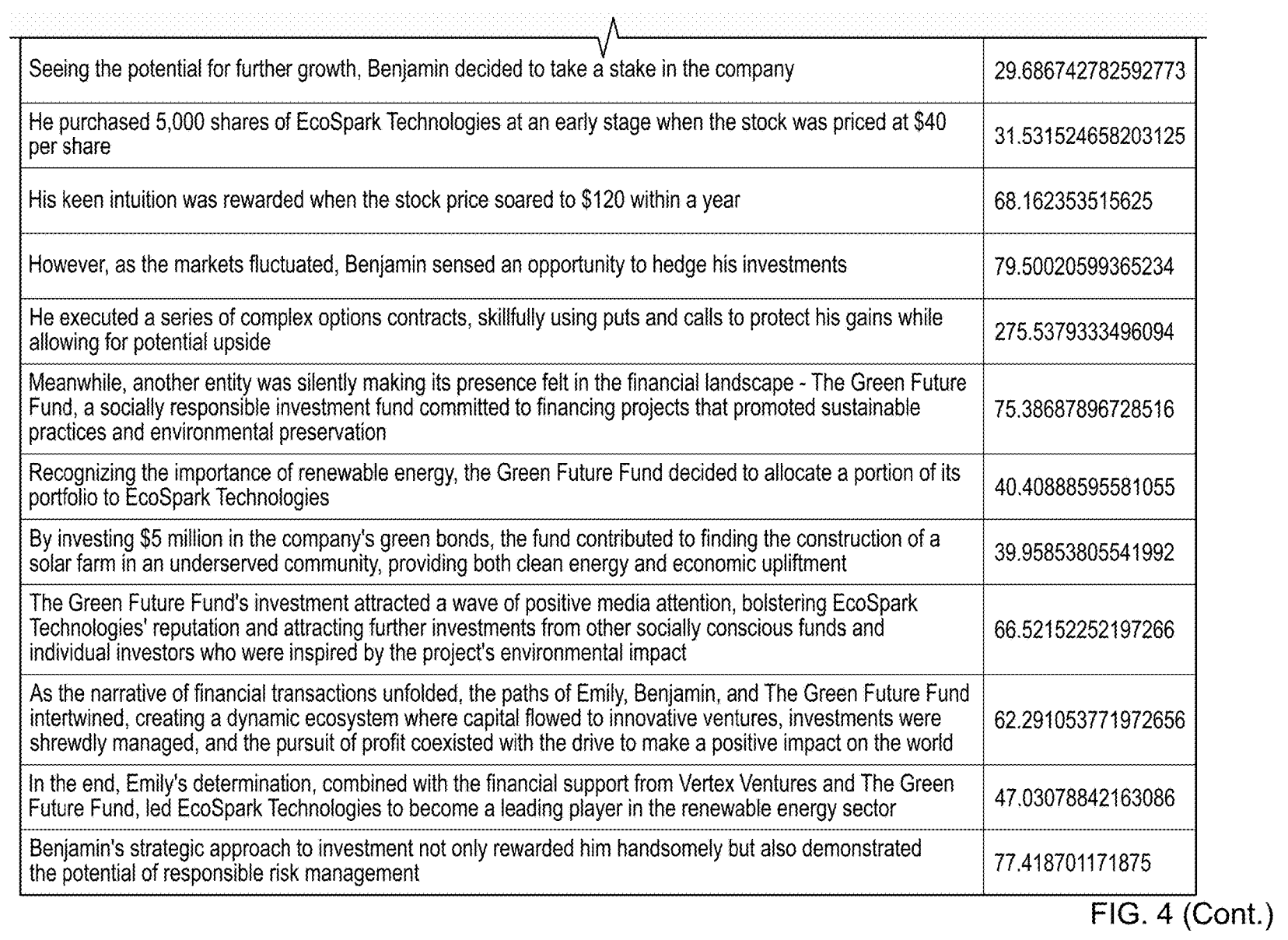

| | |
|---|---|
| Seeing the potential for further growth, Benjamin decided to take a stake in the company | 29.686742782592773 |
| He purchased 5,000 shares of EcoSpark Technologies at an early stage when the stock was priced at $40 per share | 31.531524658203125 |
| His keen intuition was rewarded when the stock price soared to $120 within a year | 68.162353515625 |
| However, as the markets fluctuated, Benjamin sensed an opportunity to hedge his investments | 79.50020599365234 |
| He executed a series of complex options contracts, skillfully using puts and calls to protect his gains while allowing for potential upside | 275.53793334960094 |
| Meanwhile, another entity was silently making its presence felt in the financial landscape - The Green Future Fund, a socially responsible investment fund committed to financing projects that promoted sustainable practices and environmental preservation | 75.38687896728516 |
| Recognizing the importance of renewable energy, the Green Future Fund decided to allocate a portion of its portfolio to EcoSpark Technologies | 40.40888595581055 |
| By investing $5 million in the company's green bonds, the fund contributed to finding the construction of a solar farm in an underserved community, providing both clean energy and economic upliftment | 39.95853805541992 |
| The Green Future Fund's investment attracted a wave of positive media attention, bolstering EcoSpark Technologies' reputation and attracting further investments from other socially conscious funds and individual investors who were inspired by the project's environmental impact | 66.52152252197266 |
| As the narrative of financial transactions unfolded, the paths of Emily, Benjamin, and The Green Future Fund intertwined, creating a dynamic ecosystem where capital flowed to innovative ventures, investments were shrewdly managed, and the pursuit of profit coexisted with the drive to make a positive impact on the world | 62.29105377197265 |
| In the end, Emily's determination, combined with the financial support from Vertex Ventures and The Green Future Fund, led EcoSpark Technologies to become a leading player in the renewable energy sector | 47.03078842163086 |
| Benjamin's strategic approach to investment not only rewarded him handsomely but also demonstrated the potential of responsible risk management | 77.41870117875 |

FIG. 4 (Cont.)

| Metric | Uses LLM based GPT | Description/Purpose |
|---|---|---|
| Perplexity | Yes | Measures how well a model predicts the text (fluency and coherence) |
| Conditional Perplexity | Yes | Assesses perplexity at a more granular level (sentence or segment) |
| Document-Level Perplexity | Yes | Evaluates perplexity over the entire document |
| Sentence-Level Perplexity | Yes | Calculates perplexity for each individual sentence |
| Fluency (Derived from Perplexity) | Yes | Infers text fluency based on perplexity scores |
| Semantic Similarity (Embeddings-based) | Yes | Measures similarity between sentence embeddings (semantic coherence) |
| Self-BLEU | No | Assesses text diversity by measuring self-similarity |
| Lexical Diversity (Distinctness) | No | Analyzes the range of unique words used in the text |
| Consistency (Embeddings-based) | Yes | Evaluates thematic or topical consistency using embeddings |
| Sentiment Analysis | No | (Uses DistilBERT) Analyzes overall sentiment of the text |
| Emotional Tone | No | Aggregates sentiment to give an overall emotional tone of the text |
| Lexical Complexity | No | Evaluates the complexity of vocabulary used in the text |
| Readability (Flesch-Kincaid Grade Level) | No | Estimates the text's readability level |
| Entity Consistency | No | (Uses spaCy NER) Measures the consistency of entity mentions |

FIG. 5

Step 810: calculate metrics for an input text (including perplexity scores describing a prediction of the text by a large language model)

Step 820: determine, based on the calculated metrics, whether to accept/reject the input text Step 830: perform an exchange of data between remotely connected computer devices based on the determining to accept or reject the text

SYSTEM AND METHOD FOR INTELLIGENT EVALUATION OF ARTIFICIAL INTELLIGENCE GENERATED TEXTS

FIELD OF THE INVENTION

The present invention relates generally to artificial intelligence based natural language processing, and more specifically to evaluating texts generated by artificial intelligence models.

BACKGROUND OF THE INVENTION

In an era where artificial intelligence (AI) powered natural language processing (NLP) models are increasingly relied upon to generate content, quantitative text evaluations are needed as a crucial quality assurance mechanism. For example, AI generated texts may be used for malicious purposes, such as for example in contexts of fraud where authorizations or actions may be provided or performed without permission, in phishing attempts where text is generated to serve an imposter. On the other hand, AI generated text may allow greater efficiency and throughput in various other contexts, such as for example text message-based customer service. Countless alternative contexts may be realized. There is a growing need for appropriate computational tools for processing and performing automated actions in response to AI generated text inputs.

SUMMARY

Some embodiments of the invention may allow for automatically evaluating computer generated content and may include, for example: calculating a plurality of metrics for an input text, where the plurality of metrics may include, e.g., one or more perplexity scores describing a prediction of the input text by a large language model (LLM); determining, based on one or more of the calculated metrics, whether to accept or reject the input text; and performing an exchange of data between remotely connected computer devices and/ or performing automated computerized actions based on the determining to accept or reject the text.

In some embodiments, calculating of metrics and determining whether to accept or reject the input text may be performed without relying on any information received subsequent to the initial receiving of the input text.

In some embodiments, automated computerized actions such as, e.g., saving/deploying or discarding an update to the LLM may be performed or taken based on the determining whether to accept or reject the input text.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIG. 3 shows tables including example metrics that may be calculated in some embodiments of the invention;

FIG. 4 shows example results of calculating sentence perplexity scores according to some embodiments of the invention;

FIG. 5 shows a table describing example metrics according to some embodiments of the invention;

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Figure 1:
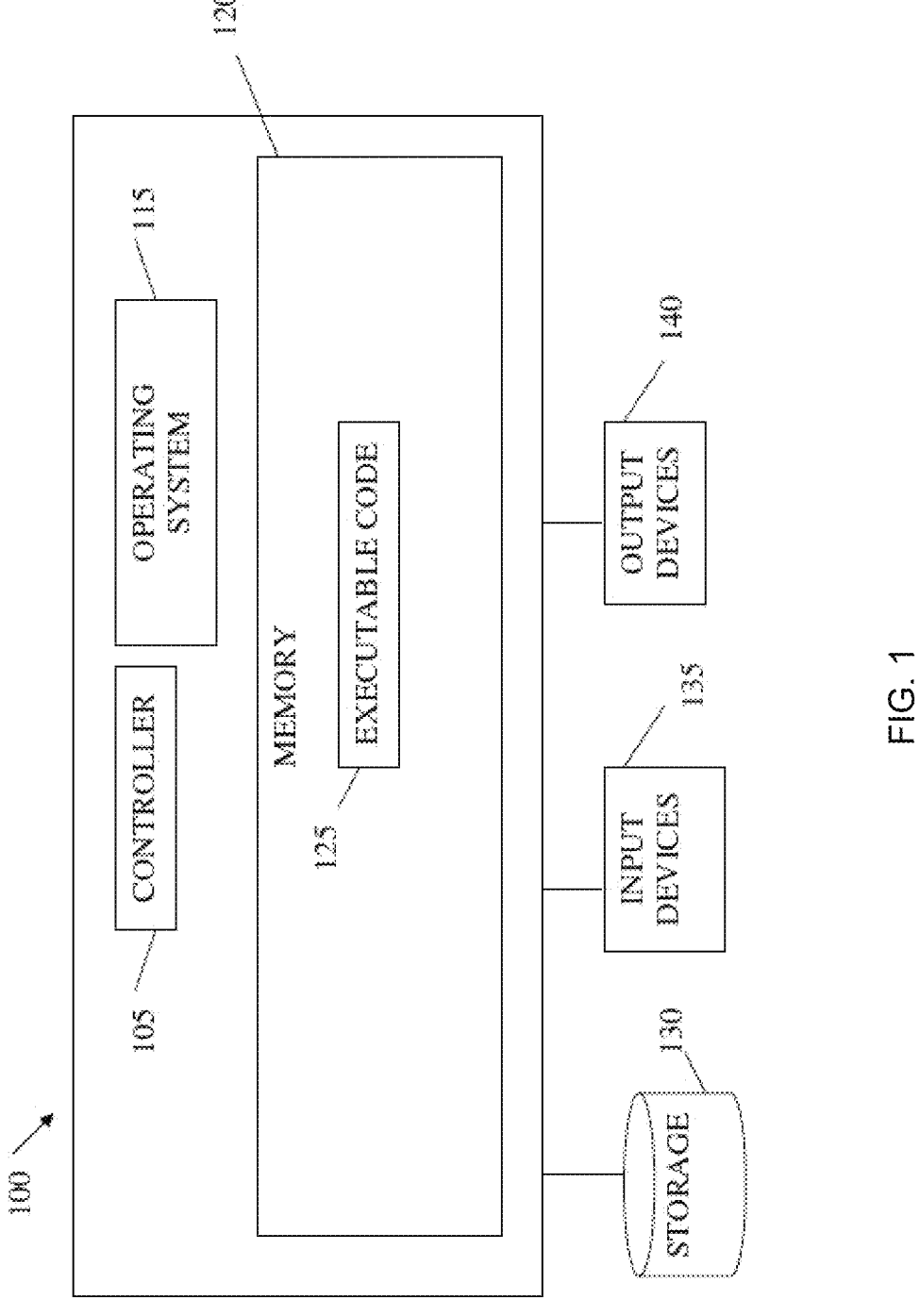
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

Figure 2:
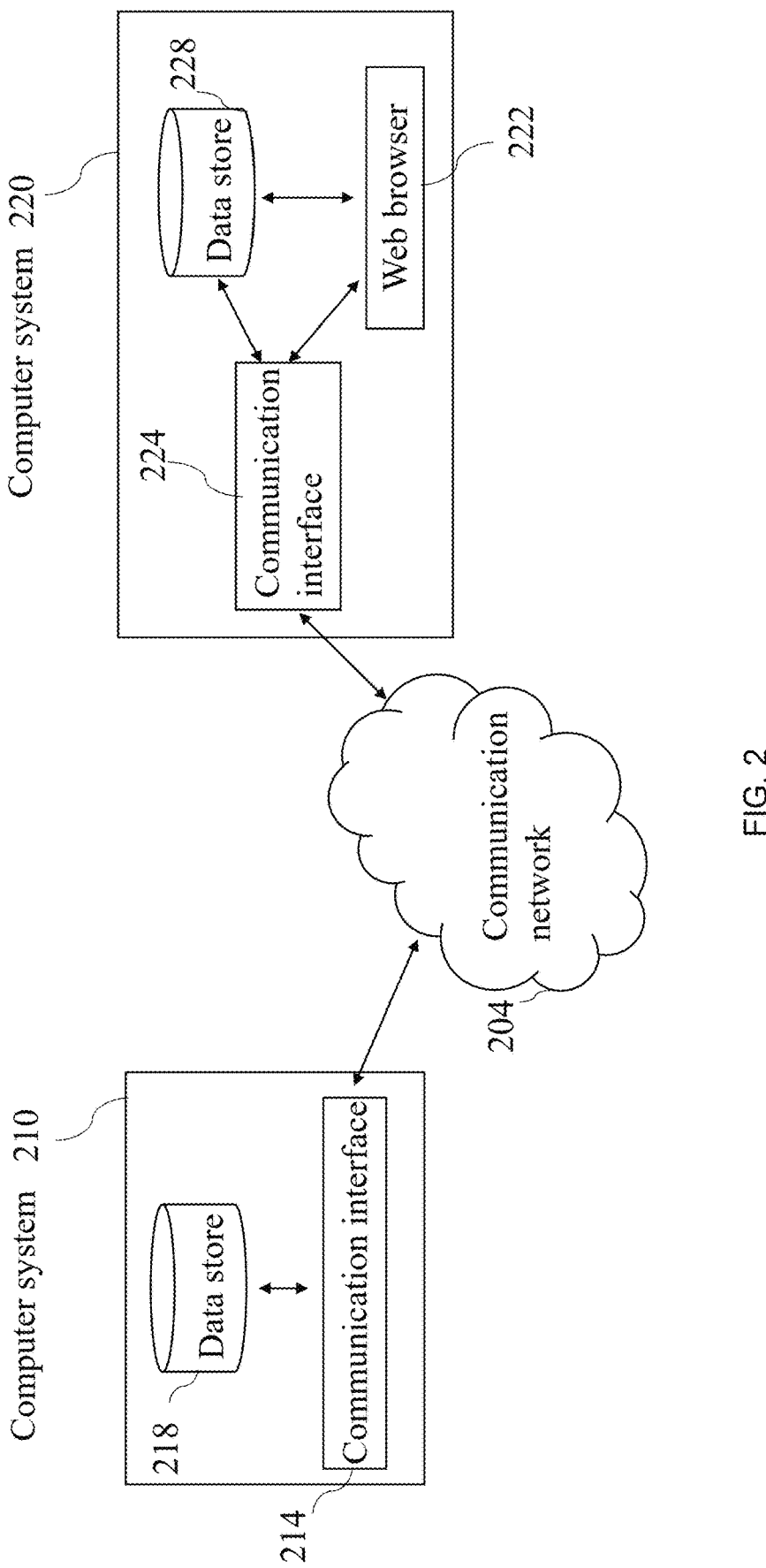
FIG. 2 shows example computer systems remotely connected by a data network according to some embodiments of the invention.

FIG. 2 shows example computer systems remotely connected by a data network according to some embodiments of the invention.

Some embodiments of the invention may include performing an exchange of data between remotely connected computer devices (for example based on determining to accept or reject an evaluated text such as, e.g., further described herein). For example, remote computer 210 (e.g., a sender computer) may send or transmit, over communication or data network 204, data items such as for example a file containing the evaluated text, and/or a computerized request or command—to computerized system 220 (e.g., a receiver computer), and/or vice versa. Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

In some embodiments of the invention, computer systems 210 and 220 may communicate via data or communication or data network 204 via appropriate communication interfaces 214 and 224, respectively—which may be for example NICs or network adapters as known in the art. Computerized systems 210 and/or 220 may include data stores such as, e.g., 218 and 228 which may for example include a plurality of received data items, messages, requests, or reports and/or assessment tables as further described herein.

Some embodiments of the invention may generate and/or process and/or analyze texts or documents, which may for example be generated by a generative artificial intelligence (GenAI) model such as for example described herein. In some embodiments, some texts or parts of a text may be produced or written by a human and/or received from an external source (such as for example a website).

Some embodiments of the invention may relate to, or may include a machine learning model, which may be for example a generative artificial intelligence (AI or GenAI) large language model (LLM). An example model type which may be used in some embodiments may include, for example, a generative pre-trained transformer (GPT) based LLM—or a different LLM, such as for example, the Claude or BLOOM LLMs, and/or additional or alternative AI models or tools. In some embodiments, a machine learning model or LLM may generate a text or a plurality of texts, and the LLM may be evaluated and/or updated—e.g., by evaluating the generated texts according to various protocols and procedures further described herein.

Embodiments of the invention may calculate or compute a plurality of metrics or scores to evaluate an input texts, and/or perform automated actions based on evaluations of input texts. Some embodiments may produce or provide report, which may for example be a table or list including a plurality of scores or metrics calculated for a given input text—as well as interpretations of these scores or metrics—for example according to the protocols and procedure described herein. Some embodiments may thus include creating an output assessment, where the output assessment may include a table of computed scores and descriptions of the scores; some embodiments may upload the output assessment to a web page (see further discussion regarding assessment tables herein).

FIG. 3 shows tables including example metrics that may be calculated in some embodiments of the invention. Some example metrics are described in detail herein.

Perplexity as used herein may be or may refer to a measure, metric or score that may be used for quantify how well a probabilistic model (which may be for example an LLM or GenAI model—such as, e.g., the generative pre-trained transformer or GPT) predicts, generates, regenerates, or reproduces a given sample or input text.

In some embodiments, perplexity may measure the uncertainty of a language model in predicting (or generating) the next token (word or character) in a sequence of text. A lower perplexity score may indicate that the model is more certain about its predictions, which may suggest or indicate that the text is more likely to be fluent and coherent. In some embodiments, perplexity may be calculated based on a probability the language model assigns to each token in the text, with the overall perplexity being the geometric mean of these probabilities. Perplexity may be or may be used by some embodiments of the invention as a key indicator of, e.g., how naturally the input content is similar to, or may mimic, natural human language. High perplexity may indicate that the model struggles to predict the sequence of words, which may result in text that is less coherent or fluent. Perplexity may help determine whether the generated text is linguistically sound and whether it would "makes sense" to a reader. For example, in a chatbot interaction, lower perplexity would suggest that the bot's responses may be more likely to be contextually appropriate and understandable.

Some embodiments of the invention may include calculating a plurality of metrics for an input text, the plurality of metrics comprising one or more perplexity scores, the perplexity scores describing a prediction of the input text by a large language model. In some embodiments, the computation of perplexity may include or involve taking the exponential of the cross-entropy loss between the model's predicted probability distribution over tokens and the actual distribution describing the input text (which may be predicted by the model). A perplexity score (such as for example element 302) may thus quantify or evaluate how well the probability distribution predicted by the model aligns with the actual words in the text. Various perplexity scores and/or approaches for quantifying and/or computing perplexity may be realized; see, however, some nonlimiting examples according to some embodiments herein.

Conditional perplexity as used herein may be or may refer to one example of a perplexity score, or to a specialized form of the perplexity metric used to evaluate the predictability and fluency of text, specifically within smaller segments or units, such as sentences or paragraphs. Unlike other example perplexity scores, which may be used in some embodiments to evaluate an entire document or a large body of text, conditional perplexity may be used to focus on such smaller units, providing a more fine-grained view of text quality.

An example formula for calculating perplexity is provided in eq (1):

$$PP(W) = \left( \prod_{i=1}^{N} P(w_i \mid w_1, w_2, \dots, w_{i-1}) \right)^{-\frac{1}{N}}, \qquad \text{(eq. 1)}$$

$$P(w_1, w_2, \dots, w_N) = \prod_{i=1}^{N} P(w_i \mid w_1, w_2, \dots, w_{i-1})$$

Where PP denotes perplexity; $w_1$, $w_2$, . . . , $w_N$=W is the sequence of N tokens or words (w) in the test set or input text; $P(w_1, w_{21} \dots, w_N)$ is the probability of the sequence W assigned by the language model—which may be the sum of the conditional probability of predicting each token or word $w_i$ (e.g., as it appears in the input text) by the language model based on all tokens up to $w_{i-1}$; and N is the total number of tokens or words in the test set. Additional or alternative formulas may be used in calculating perplexity scores in different embodiments of the invention.

Some embodiments may include or involve calculations of conditional perplexity. For example, conditional perplexity may be calculated by computing or quantifying the perplexity of each sentence or paragraph in the context of the surrounding text, or of a particular text segment (as opposed to, e.g., in the context of the entire text). Given the preceding content, it may measure, for example, how well a language model may predict each text segment (for example by comparing the conditional perplexity calculated using eq. 1 with an appropriate reference, such as, e.g., an output of a probability function describing frequencies or probabilities of words according to their occurrence in the input text, and/or without a comparison to a reference; see further discussion herein). This approach may be particularly useful for understanding the flow and coherence of text at a more localized, fine-grained level. In some embodiments, the model may calculate the probability of each word or token in a segment, given the previous words or tokens, and conditional perplexity may be computed based on a plurality of such probabilities.

Maintaining coherence and logical flow within each part of the text may prove crucial for AI-generated text. High conditional perplexity calculated for a given segment may indicate a breakdown in coherence or a shift in style or topic. This may be especially important in applications like article writing, report generation, or conversational AI, where the output text may be required to be coherent, consistent and logical, and where each section or part in the text may be required to refer to or be coherent with the preceding sections or parts.

In some embodiments of the invention, conditional perplexity computation may involve analyzing each textual segment in the context of the preceding content rather than in isolation. The language model's predictions for each word in the segment may be compared against the words in the original sentence, and the perplexity for the segment may be calculated based on the comparison, and/or based on the model's own probabilities (e.g., conditional probabilities) and/or confidence intervals in predicting words or tokens based on preceding words (see further discussion herein). In one nonlimiting example, a comparison may include, e.g., determining the probability assigned by an LLM to a given word $w_i$ being the next word after a preceding context of words $w_1$, $w_2$, . . . $w_{i-1}$—where $w_i$ is in fact the word following the context of $w_1$, $w_2$, . . . $w_{i-1}$ in the input text or sentence (as expressed, e.g., in eq. 1). In some embodiments, the overall conditional perplexity may be calculated as an average or cumulative measure across all segments.

Document perplexity as used herein may refer to a metric used to assess or quantify an entire document's overall complexity and predictability, and which may serve as a holistic measure of the fluency and predictability of an entire text. This metric may be used, e.g., to consider a large block of text. Unlike conditional perplexity, which focuses on smaller segments like sentences or paragraphs, document perplexity may evaluate fluency and cohesiveness of the text as a whole.

In some embodiments of the invention, a document perplexity metric may measure the perplexity across the entire text or document, which may be considered as a continuous sequence of words or tokens. A language model may be used in this evaluation may predict, or to provide a probability for each word $w_i$ in the context of all preceding words $w_1$, $w_2$, . . . $w_{i-1}$ throughout the entire document. A document perplexity score may be calculated based on how well the model's predictions align with the actual sequence of words in the original text. A lower document perplexity score may indicate that the model finds the entire document more predictable, which may suggest or imply better overall fluency and coherence.

Document perplexity may thus be valuable for understanding how well the entire content holds together as a cohesive unit, and may measure the effectiveness of the AI model in producing, start to finish, text that is logical and easy to follow.

In some embodiments of the invention, computation of document perplexity may include or involve processing the entire text as one continuous sequence of tokens or words, with the language model generating a probability for each word based on all the preceding text (which may amount to, e.g., all words or tokens preceding the word or token to be predicted). A perplexity value may then be calculated as the geometric mean of these probabilities.

Sentence perplexity as used herein may be or may refer to a metric which may be used to evaluate the complexity and predictability (or generatability) of individual sentences within a body of text. It may offer a focused lens on the fluency and coherence of each sentence, as opposed to, e.g., to document perplexity, which may evaluate the text as a whole. Sentence perplexity may be used for identifying specific sentences that may represent inconsistencies and/or that may degrade the overall quality of the text.

In some example embodiments, perplexity scores describe predicting of one or more individual sentences by the LLM. In some embodiments, calculation of sentence perplexity may include or involve processing each sentence independently. For each sentence in the text, the language model may calculate the likelihood of the sequence of words as they appear in that sentence. This may be performed by predicting or generating each word in the sentence based on the previous words, and comparing the predicted words with their counterparts in the original sentence. The perplexity score for each sentence may then be computed based on these probabilities. A lower perplexity score for a sentence may suggest that the sentence may be more predictable and likely more coherent and fluent. An example algorithm for calculating sentence perplexity may involve several steps, and may include or focus on the prediction of words in a sentence and the comparison of these predictions with the actual words in the sentence, such as for example:

Tokenization: a given sentence may be split into tokens (for example words or subwords, as, e.g., depending on the model's training data, specific model architecture, and the like). Word Prediction & Probability Estimation: For each token $w_i$ in the sentence, the language model may estimate the probability of predicting $w_i$ given the preceding tokens $w_1$, $w_2$, . . . , $w_{i-1}$ (such as for example described using example formulas herein). This estimation may be based on the language model's understanding of the language structure, as may be reflected in training the model on vast amounts of documents and/or text data.

Comparison & Probability Aggregation: The probability of each word in its context (e.g., as may be predicted using preceding tokens, e.g., in a specific text segment) may be directly obtained from the language model's output. In some embodiments, there may be no explicit "comparison" in the traditional sense, e.g., with an external reference; instead, the model's own confidence statistics in predicting the actual next word given the previous context may be provided and used as the comparison metric (see also further discussion herein regarding obtaining some metrics according to some embodiments of the invention).

Perplexity Calculation: The perplexity of the sentence may then be calculated using these probabilities, and for example using an example formula for sentence perplexity (PP) such as for example:

$$PP(W) = 2^{-\frac{1}{N}\sum_{i=1}^{N} log_2 P(w_i|w_1,w_2,...,w_{i-1})} \qquad \text{(eq. 2)}$$

(see, e.g., description of the notation herein)

A nonlimiting practical example may be, e.g.:

Consider the sentence: "The cat sat on the mat." In a simplified example:

Tokenization: Split into ["The", "cat", "sat", "on", "the", "mat" ].

For each word, starting with "cat" (assuming "The" is given), the model may predict the next word's probability. For instance, given "The", the model may estimate P("cat"|"The")=0.05 and may proceed through the sentence, calculating probabilities for each word given or based on its predecessors.

Calculate Perplexity: A formula such as for example provided in eq. 2 may be used to find or calculate the sentence's perplexity. Lower perplexity scores may indicate the sentence is more predictable (and presumably more fluent) according to the model.

Additional or alternative formulas for sentence perplexity may be used in different embodiments of the invention.

In some embodiments of the invention, calculating sentence perplexity may include for example generating, by the language model, a probability distribution for each word in a sentence based on the preceding words. A sentence perplexity score or metric may be calculated as the exponential of the average negative log-likelihood of these probabilities.

When a language model predicts the next word in a sentence, it may generate a categorical (or discrete) probability distribution over its entire vocabulary. This distribution may assign a probability to each of a plurality of possible next words given the sentence's context so far (which may for example correspond to tokens preceding the possible next word in a given text segment). The sum of these probabilities may equal 1, and each probability for a given possible next word may describe the model's estimation of how likely the word is to follow the corresponding context. An example probability distribution according to some embodiments may be, e.g.:

$$P(w_i \mid w_1, w_2, \dots, w_{i-1}) = \frac{\exp(\text{score}(w_i, w_1, w_2, \dots, w_{i-1}))}{\sum_{u' \in V} \exp(\text{score}(w', w_1, w_2, \dots, w_{i-1}))} \qquad \text{(eq. 3)}$$

where score (w', $w_1$, $w_2$, . . . , $w_{i-1}$) may be a function computed by the language model that assigns a raw or default score to each word or token w, given the context of preceding tokens $w_1$, $w_2$, . . . , $w_{i-1}$. This score may be provided from the output layer of the neural network, e.g., before or prior to applying a softmax function to that output. V may refer to the vocabulary of the language model, i.e., the set of all words the model may predict (e.g., based on the training set used for the model). The denominator in eq. 3 corresponds to the sum of the exponentiated scores of all possible next words in the vocabulary, ensuring that the probabilities sum up to 1.

An example probability distribution may accordingly be expressed or visualized as a long vector where each component may correspond to a word in the model's vocabulary, and each value may be the probability of that word being predicted by the model as the next word based on the given context. Most probabilities in the vector may be very close to zero, with a few higher values indicating words that are more likely to be the next word according to the model. For example, if the vocabulary is {"cat", "mat", "sat", "on", "the" } and the context is "The cat", the probability distribution may be, e.g.:

$$P\{\text{"cat"} \mid \text{"The cat"}\} = 0.001 \qquad \text{(eq. 4)}$$
$$P\{\text{"mat"} \mid \text{"The cat"}\} = 0.002$$
$$P\{\text{"sat"} \mid \text{"The cat"}\} = 0.8$$
$$P\{\text{"on"} \mid \text{"The cat"}\} = 0.15$$
$$P\{\text{"the"} \mid \text{"The cat"}\} = 0.047$$

These example values may indicate that, given the context "The cat", the model may find "sat" to be the most probable next word, followed by "on", "the", "mat", and "cat", in that order. This probability distribution may thus encapsulate or represent the language model's prediction for the next word, based on the learned patterns from the training data. Additional or alternative procedures, expressions or formulas for calculating probability distributions may be used in different embodiments of the invention.

FIG. 4 shows example results of calculating sentence perplexity scores according to some embodiments of the invention. In some example embodiments, calculated metrics form a perplexity table 402, the perplexity table describing the one or more individual sentences. Some embodiments may produce or provide a table or list including some or all sentences in a given input text with their corresponding perplexity scores (such as for example element 404).

In some example embodiments, the plurality of metrics include at least one of: a text sentiment metric, a text diversity metric, a text readability metric, and an entity consistency metric.

Fluency as used herein may be or may refer to a metric indicative of or quantifying the smoothness and readability of the text. It may encompass how well the text mimics the flow and structure of human language, making it easy to read and understand. In some embodiments, fluency may be evaluated by analyzing the text's grammatical correctness, and/or the appropriateness of word choices, and/or the overall ease of reading.

Some embodiments may include calculating a text readability metric or a fluency metric (such as for example element 306). In some embodiments of the invention, measuring, assessing, or quantifying fluency may include or involve various techniques, from rule-based checks for grammar and syntax to more sophisticated methods using AI language models that may predict the likelihood of sequences of words. Some generative AI models, like GPT, may generate text that is then evaluated for fluency based on these models' understanding of natural language patterns.

An example algorithm or procedure for calculating text fluency may be or may include, for example:

1. Preprocessing: The input text may be tokenized into sentences and/or tokens (words), for example depending on the granularity desired for the fluency metric.
2. Grammar and Syntax Analysis: rule-based checks may be employed to assess the grammatical correctness of the text, which may include or involve the use of predefined grammar rules typical of natural languages. Various rule based checks are known in the art and may be used in different embodiments of the invention.
3. Word Choice Appropriateness: embodiments may analyze the appropriateness of word choices within the context of sentences, for example utilizing a combination of rule-based methods and statistical models known in the art to assess word appropriateness.
4. Overall ease of reading: readability formulas (such as for example the Flesch-Kincaid Readability Test) may then be employed to estimate the text's ease of reading, for example, based on sentence length and word complexity.
5. AI model for calculating sequences likelihood: a generative AI model, such as for example a GPT model, may be used or utilized to predict the likelihood of sequences of words. This may involve generating text based on a prompt (such as for example a part of the input text) and comparing the generated text's fluency or readability to the original (for example using formulas mentioned herein and/or known in the art).
6. Fluency score calculation: embodiments may aggregate the results from the above steps into a comprehensive fluency score. In some embodiments, the comprehensive fluency score may be or may include a weighted average where different aspects (grammar, word choice, readability) may be assigned different weights based on their importance to overall fluency.

In this context, example formulas and models which may be used in different embodiments to evaluate fluency or readability may include:

The Flesch-Kincaid Grade Level readability formula:

$$0.39\left(\frac{\text{Total words}}{\text{Total sentences}}\right) + 11.8\left(\frac{\text{Total syllables}}{\text{Total words}}\right) - 15.59 \qquad \text{(eq. 5)}$$

where 0.39 is a constant multiplier for the average number of words per sentence, where 11.8 is a constant multiplier for the average number of syllables per word—which may reflect the contribution of word complexity (in terms of syllables) to the overall readability of the text, and where −15.59 is a constant that adjusts the final score to align with the Flesch-Kincaid grade-level scale.

Sequences likelihood formulas used as part of machine learning or AI Models, such as for example conditional probability formulas provided herein.

Additional or alternative statistical models or neural networks known and used in the art to evaluate context-appropriateness of word choice.

Additional or alternative procedures and expressions for calculating text fluency or readability may be used in different embodiments of the invention.

Semantic similarity as used herein may be or may refer to measuring likeness or equivalence in meaning between two text segments. It may quantify or assess how closely the contents of each segment are related to each other. In some embodiments, semantic similarity may be used for quantifying consistency and relevance of text portions or segments, and may determine whether different parts of the content may be thematically aligned.

Example calculations of semantic similarity may include or involve, for example, analyzing the text to extract meaning from words, phrases, and sentences and then comparing these semantic representations to evaluate similarity. Advanced AI models, particularly those trained in deep learning, may be used to analyze the context and nuances of language, which may be used in computing semantic similarity—which may include using token or word embeddings being, for example, vector embeddings or vector representations, where words may be converted into vectors (e.g. ordered lists of numbers) in a high-dimensional space. The similarity between these vectors may then be calculated (using, for example, a cosine similarity formula; see, for example, element 308).

In some example embodiments, a plurality of scores or metrics may be calculated using a plurality of vector embeddings or representations. In some embodiments of the invention, assessments or calculations of semantic similarity may involve converting text into semantic representations using language models and then calculating the similarity between these representations. In some example embodiments, one or more vector embeddings describe a plurality of sentences in the input text, and/or one or more of vector embeddings describe a plurality of words in the input text.

Some example embodiments may accordingly include calculating a text diversity metric or a semantic similarity metric for example based on sentence and/or word embeddings. For example, techniques like transformer-based models (like BERT or GPT-3) may be used for capturing semantic relationships in the text.

Embeddings according to some embodiments of the invention may be, e.g., dense vector representations of words, tokens, sentences, or documents, where each element in the vector may capture some aspect of the text's semantic properties. Similar meanings may be represented by vectors that are close to each other (e.g., as may be measured using a similarity or distance formula such as for example a cosine similarity formula) in the vector or embedding space.

In some machine learning models or LLMs, such as for example GPT (Generative Pre-trained Transformer) models, embeddings for words or tokens may initially be calculated using dedicated learned embedding layers that may map each token to a high-dimensional vector space. These initial embeddings may undergo further transformations through the model's layers, where the context of each word may be integrated into its representation, which may result in context-sensitive embeddings. In such manner, embeddings may be calculated dynamically, meaning the representation of a word may depend on its context within a sentence, not just on the word itself, and/or on token or letters included in it. This may allow the model or LLM to capture nuanced semantic relationships of relevant words or tokens.

In some embodiments of the invention, embeddings from models or LLMs such as for example GPT may be obtained and used from various machine learning platforms and/or frameworks (such as for example Hugging Face's Transformers library), and/or directly via application programming interfaces (APIs) provided by the model's developers (such as, e.g., an OpenAI provided API access to GPT models, which may be used to generate embeddings).

An example process for generating or extracting word or token embeddings according to some embodiments may include using a dedicated API or library to process the text with a corresponding machine learning model or LLM such as for example GPT, to obtain embeddings for the text segments of interest, and calculating or computing cosine similarity between embeddings of different text segments to assess their semantic similarity as part of calculating or computing various metrics such as for example described herein.

Additional or alternative programs, platforms, and/or tools may be used and/or further abstract and/or detail of how embeddings are generated and compared, may be used in different embodiments of the invention.

Self-BLEU may be or may refer to an example metric (which may for example be considered as a text diversity metric) adapted from the bilingual evaluation understudy (BLEU) score, traditionally used in machine translation to evaluate the quality of translated text against a reference translation. Self-BLEU may be applied to a single document to assess the internal diversity of the text, and may measure how much sentences within the document resemble each other.

In Self-BLEU, text segments (usually sentences) may be compared against other segments within the document. A high Self-BLEU score may indicate a high level of similarity (or lack of diversity) among the sentences, while a lower score (such as for example in element 304) may suggest greater variability and originality in the content.

In some embodiments of the invention, a computation of Self-BLEU may include or involve comparing each sentence to other sentences in the text. The BLEU score for each sentence with reference to all other sentences may be calculated, and an average of the BLEU scores for each sentence in the document may be calculated as the Self-BLEU or internal diversity score for the document or text.

An example process or algorithm for calculating or computing Self-BLEU metrics or scores may include, e.g.:

Tokenize input text or document (for example into sentences) For each token or sentence in the document, treat that sentence as the "candidate" and all other sentences as "references".

Calculate the BLEU score for each candidate sentence against its references, for example according to n-gram precision expressions or functions, e.g., as described herein, and apply a brevity penalty if the candidate sentence is shorter than the reference sentences.

Average or aggregate the BLEU scores obtained for each sentence across the document to compute the Self-BLEU score.

An example formula for calculating a BLEU score for a single candidate sentence against its references may be, for example:

$$BLEU = BP * \exp\left(\sum_{i=1}^{N} \omega_n \log_2 p_n\right) \qquad \text{(eq. 6)}$$

Where BP may be the brevity penalty, which may be defined or calculated as $\exp(1-r/c)$ for parameter values $c<r$, or set to 1 otherwise; c may be the length of the candidate sentence; r may be the effective reference input text, document, or corpus length; $p_n$ may be an n-gram precision expression, which may be calculated as the ratio of the number of n-grams in the candidate that match n-grams in any reference sentence to the total number of n-grams in the candidate; $\omega_n$ may be a weight for each n-gram size, which may be set to 1/N where N is the maximum n-gram size in the input or document.

An example BLEU score or metric provided by some embodiments of the invention may reflect a given sentence's similarity to the other sentences in the input text or document. Additionally or alternatively, embodiments may calculate a BLEU-based or Self-BLEU score for a document or input text, where the Self-BLEU score may the average of these individual BLEU scores for sentences, indicating the overall internal diversity or semantic diversity. A high Self-BLEU score may suggest less diversity (e.g., more semantic similarity among sentences in the input), while a lower score indicates higher diversity (greater variability in sentence structure and content within the input). Examples for Self-BLEU scores provided herein may provide a quantifiable measure of text diversity within a document. Additional or alternative procedures and/or formulas for quantifying or computing text diversity may be used in different embodiments of the invention.

It should be noted that in addition to the protocols and procedures described herein, additional or alternative protocols for calculating various metrics (such as for example some or all of the metrics considered herein) may be used in different embodiments of the invention.

Some embodiments may include calculating a text sentiment score or metric or an emotional tone score or metric (such as for example in element 310), which may include for example counting or quantifying positive and/or negative terms or topics within a given input text. In some embodiments, positive and/or negative terms may be predetermined, e.g., by a system administrator and may be added or included a database of negative or positive terms or topics. Additionally or alternatively, some embodiments may classify or categorize terms or topics as positive based on their semantic similarity to reference terms (which may be for example terms classified or added to a list or database of negative/positive terms by a user or system administrator)— for example based on appropriate vector or word embeddings for the relevant terms or topics. Various sentiment scores and/or procedures for calculating sentiment scores or metrics are known in the art and may be used in different embodiments of the invention.

Some embodiments may include calculating an entity consistency score or metric such as for example in element 312). In some embodiments of the invention, entity consistency scores or metrics may include calculations of, for example, perplexity and/or fluency scores and/or of additional or alternative scores and metrics (such as for example described herein) across different "entities" that may be associated with different parts or segments of the input text. For example, an input text describing a conversation or dialogue between two speakers A and B may be analyzed by some embodiments to determine if texts associated with speaker or entity A are consistent across different segments of the text (such as for example if the perplexity scores of sentences said by A in the beginning of the conversation are similar to or different from perplexity scores of sentences said by A towards the end of the conversation). It should be noted that various different approaches and/or protocols for calculating entity consistency scores (including, for example, various different definitions and/or parameters and/or criteria for the length of text segments associated with a given entity, various thresholds for determining if scores differ across different segments, and the like) may be used in different embodiments of the invention.

Some embodiments of the invention may further include calculating additional scores or metrics—as well as additional computational or analyses—including and/or relating to for example lexical diversity (which may, e.g., measure or quantify the range and variety of the vocabulary used in a text), consistency (which may e.g., relate to the degree to which the content of a text is uniform in terms of style, emotional tone, topic, and factual accuracy), sentiment and emotional tone analyses (which may refer to, e.g., identifying and categorizing opinions or emotions expressed in a text), lexical complexity (relating to, e.g., the diversity and sophistication of a vocabulary used in a text), readability (relating to, e.g., the ease of reading and understanding a given text), and entity consistency (relating to, e.g., how consistently specific entities—such as for example names, places, technical terms, and the like—may be mentioned and used throughout the text). In addition to the various example metrics and/or scores and/or analyses mentioned herein, additional or alternative metrics and analyses are known in the art and may be used in different embodiments.

Some embodiments of the invention may include calculating a conceptual density score or metric (for example among additional metrics described herein). In some embodiments, a conceptual density metric may be used to quantify the depth and concentration of concepts covered within a text, offering insights into the text's informational richness and conceptual breadth, and may help, e.g., in distinguishing texts that densely pack information from texts that are more repetitive or superficial.

Unlike, e.g., some example lexical diversity scores, which may focus on the variety of terms in a vocabulary, conceptual density may assess the diversity and breadth of topics, ideas or concepts conveyed or included in an input text.

An example algorithm for calculating conceptual density may include, e.g.:

Concept identification: extract concepts or topics from an input text—for example using named entity recognition (NER) and/or topic modeling techniques (various different techniques are known in the art). Identified concepts or topics may be, e.g., named entities, technical terms, or a thematic idea (such as for example "communication", "network", and the like, in an input text describing, e.g., a hardware network card).

Concept weighting: assign weights to concepts, for example based on their relevance and the context (which may be, e.g., words or terms surrounding the concepts or topics extracted from the text) in which they appear. Relevance may be determined, for example, through techniques like TF-IDF (term frequency-inverse document frequency), where more unique concepts to the document (or corpus) are given higher weights. Additional or alternative weighing schemes and procedures may be used in different embodiments.

Conceptual overlap and integration: Evaluate the integration of concepts within the text by analyzing the context (which may be, e.g., surrounding words or terms) shared between concepts. This can be achieved, for example, using a co-occurrence analysis or technique, where closely related concepts appearing in similar contexts (for example appearing next to each other within the text, or within sentences of the text) are measured and/or weighted to contribute more to the text's conceptual density, as for example calculated below.

Conceptual density calculation: compute the conceptual density score or metric, for example as a weighted average of the identified concepts, taking into account their weights and their integration within the text (e.g., according to the preceding steps).

An example formula for calculating conceptual density (CD) scores or metrics for an input text may be:

$$CD = \frac{\sum_{i=1}^{N} w_i c_i}{T} \qquad \text{(eq. 7)}$$

Where N is the number of unique topics or concepts identified in or extracted from the text, T is the total number of topics or concepts (including repetitions), $w_i$ is the weight assigned to the i-th concept, which may be determined according to its relevance (e.g., using TF-IDT, or an alternative relevance weighing technique), and ci is a measure for the i-th concept's integration within the text—which may for example be derived using co-occurrence analysis (which may take into account, for example, how many topics or concepts co-occur with, or appear next to, or in close proximity to, the i-th concept). The output score or metric may be a single score representing the text's conceptual density. Higher scores may describe texts with a rich variety of closely integrated concepts (for example topics such as "internet" and "communication" being used as co-occurring words in various sentences within an input text), suggesting a deeper, informationally dense textual composition compared to texts described by lower conceptual density scores. Additional or alternative procedures for calculating conceptual density scores or metrics may be used in different embodiments of the invention.

FIG. 5 shows a table describing example metrics according to some embodiments of the invention. In some embodiments of the invention, some example metrics such as for example perplexity-, fluency-, semantic-similarity-, and consistency-related metrics may be calculated or computer using a GPT-type LLM. Calculations of some such metrics may, for example, be embedded into relevant LLMs (such as for example the GPT 4.0 LLM) in a black-box-like manner. Some metrics considered herein may be calculated using some of the following example platforms and tools:

Hugging Face Transformers library: a comprehensive framework for natural language processing (NLP) that provides access to pre-trained models like GPT, BERT, and others. It offers easy-to-use interfaces for a wide range of NLP tasks, including text generation, sentiment analysis, and the like.

OpenAI's GPT API provides API access to versions of GPT, including GPT-4. This API allows for straightforward integration of the model's capabilities into applications, enabling tasks such as text generation, translation, and basic analysis without needing to manage the underlying model infrastructure.

Python Libraries for NLP: NLTK (natural language toolkit) and spaCy, Python libraries for natural language processing.

In some example embodiments, the calculation of plurality of metrics or score such as for example described herein may be implemented into, or embedded in a custom layer built on top of APIs such as for example the GPT API, or a corresponding software package that may use, for example, the Transformers library to make calculations of more complex metric more simple to implement. One skilled in the art may recognize that various additional or alternative tools or platforms for implementing some of the scores or metrics described herein into corresponding, appropriate machine learning or NLP frameworks may be used in different embodiments of the invention. By combining these tools and platforms, developers can effectively calculate the metrics mentioned, integrating the powerful capabilities of LLMs like GPT with the analytical tools provided by NLP libraries. This approach allows for a flexible and powerful system for analyzing text across various dimensions.

In some embodiments of the invention, some of the metrics described herein may for example be calculated along neural layers (such as, e.g., deep and/or convolutional layers) of a corresponding LLM or alternative, appropriate neural network or machine learning model—and thus be implemented in the architecture of such a model. In such manner, some embodiments may output text evaluation metrics without relying on explicit formulas and/or parametrization—and a machine learning model or LLM may be trained, for example on a large number (e.g., millions) of past evaluations of text for outputting text evaluation metrics, utilizing, e.g., state of the art generative artificial intelligence techniques. Additional or alternative protocols and procedures for calculating evaluation metrics may be used in different embodiments of the invention.

Metrics denoted as "based on GPT" (Generative Pre-trained Transformer), may for example utilize a GPT model's capabilities to evaluate, analyze, or interpret an input text. GPT models may be used to generate coherent and contextually relevant text. In some embodiments, when a metric is calculated in a GPT-based manner, the model's ability to predict or generate text sequences may be used as part of the metric computation or evaluation process. For example, in assessing the coherence of a given text, the metric may involve GPT generating a continuation of the text and then analyzing how seamless and contextually appropriate this continuation is (such as for example predicting or generating the next word in a given sentence and comparing the predicted output with the original sentence, and so forth, such as, e.g., described herein).

In some embodiments of the invention, GPT models may be trained on, or be fine-tuned using diverse datasets encompassing various language styles and topics, or domain-specific text. In some embodiments, model fine tuning may for example be performed using a corresponding platform such as, e.g., OpenAI's GPT API, and/or using various NLP libraries known in the art. Metrics based on GPT according to different embodiments may, therefore, be adapted or adjusted to different types of text, whether it's formal business communication, casual dialogue, or technical writing. Embodiments may utilize GPT models' computational efficiency to provide metrics, as well as analysis and feedback, in real-time. This may be particularly useful in dynamic conversational agents or real-time content moderation applications.

Some embodiments may thus include a language model fine-tuned on domain-specific text, which may allow it to grasp the nuances and complexities of financial language and context. This fine-tuning process may dynamically adjusted to cater to the evolving linguistic landscape of a field of knowledge or textual domain. In some embodiments, fine-tuning may not be a one-off process but a continuous (e.g., iterative) or ongoing adjustment. It may enable the system to remain current and up to date with the latest linguistic trends and regulatory changes.

A nonlimiting example demonstrating a model tuning process, on an example, dynamically updated or evolving dataset, may include, for example:

Background: consider an example dataset composed of social media posts from, e.g., social media platforms. The dataset may initially be created to train a model, e.g., for sentiment analysis, content moderation, or trend analysis.

Updating process: The dataset may be updated in real-time or near-real-time to include the latest or most recent posts. For example, the dataset may be updated or expanded every few hours (e.g., 2 hours) with new posts to capture or describe the latest internet jargon, trending topics, emojis, and the like. An automated script may be used to scrape new posts based on trending hashtags or keywords and add them to the dataset, for example following some preprocessing steps (e.g., removing personally identifiable information, standardizing text format, and the like, as known in the art).

Model fine-tuning: a GPT model may be periodically fine-tuned with the updated dataset to adapt to the latest language trends and jargon. This can be done daily or weekly, for example, depending on the rate of change in the data domain (e.g., once per every 30 updates to the training dataset).

Technical steps which may be included in fine tuning may be, e.g.:

1. Load the pre-trained GPT model (e.g., GPT-4) using a library like Hugging Face's Transformers.
2. Prepare the updated dataset, ensuring it is formatted correctly for the model (e.g., tokenization, encoding).
3. Define a fine-tuning routine, including setting up a loss function appropriate for the task (such as, e.g., cross-entropy loss for classification tasks), an optimizer, and a learning rate schedule.
4. Train the model on the updated dataset for a certain number of epochs, monitoring performance on a validation set to prevent overfitting.

5. Evaluate the fine-tuned model on a test set to ensure it performs well on unseen data.

In this context, various tuning procedures or workflows, loss or reward functions, evaluation schemes, and the like, are known in the art and may be used as part of fine tuning machine learning models or LLMs according to different embodiments of the invention.

Embodiments of the invention may improve AI based language generation and processing technologies by allowing to rapidly process and systematically evaluate large volumes of text with high accuracy—and to perform automated computerized actions based on text evaluation. Embodiments may perform text evaluations in a manner tailored to the specific text considered (such as, e.g., by training or adjusting the underlying LLMs to a specific field of knowledge, domain, or field and/or by using specific datasets for training or adjusting the relevant models), and may be highly suitable for a variety of large-scale applications.

In some example embodiments the calculating of metrics and the determining whether to accept or reject (or whether to approve or dismiss) the input text are performed without relying on any information received subsequent to a receiving of the input text. Some embodiments of the invention may improve AI based language generation and processing technologies by allowing to evaluate or assess text content using the calculations and/or computations and/or scores and/or metrics described herein, and without relying on additional data and/or references and/or benchmarks external to the text being evaluated—marking a significant departure from traditional validation methods (often relying on additional, external benchmarks). In such manner, some embodiments may provide reference-free text evaluation—which may for example be performed without relying on any data and/or information received subsequent to, or following the receiving and/or to the processing of the input text considered or evaluated by embodiments of the invention.

Some embodiments may for example be used for ensuring text accuracy, reliability, and compliance with regulations in various fields and use cases. In one nonlimiting example, a financial institution may increasingly leverage artificial intelligence (AI) technologies—and particularly natural language processing (NLP) models—to automate various aspects of its operations, including customer service, risk assessment, and investment analysis. Evaluations of AI-generated texts according to some embodiments of the invention may thus serve as a safeguard against potential errors, biases, or misleading information included in AI generated content that could have significant financial repercussions. Moreover, in industries heavily regulated by authorities such as legal or financial regulatory bodies and compliance agencies, robust evaluations provided by some embodiments of the invention may help ensure that AI-generated texts (such as for example legal contracts) adhere to regulatory guidelines, while maintaining compliance and mitigating legal risks.

Some embodiments may be used for identifying and documenting the effects of substantial modifications and updates to, for example, AI prompts, training datasets, and model versions—for example by providing consecutive or subsequent evaluations (e.g., prior and subsequent to an update or a retraining of an AI model) that may be compared with one another to identify relevant effects and performance considerations.

Some example embodiments may include deploying an update to the LLM based on the determining whether to accept or reject the input text. In some embodiments, automated actions performed based on accepting or rejecting a text may include, e.g., saving, approving, or deploying an update to an AI model, or to GenAI model or LLM (such as, e.g., one the nonlimiting example models mentioned herein, which may for example be retrained or fine-tuned using custom datasets describing relevant topics and/or fields of knowledge), and/or discarding or deleting such an update— for example if the update results in deteriorated performance, which may, e.g., measured as differences between metrics calculated prior and subsequent to the relevant update.

An example updating Process for a GPT Model according to some embodiments of the invention may be, e.g.:

Adjusting neural weights using updated training dataset:

Example scenario: a GPT model initially trained on a first dataset. An updated, second dataset may then be received, which may include text describing recent developments in technology and internet culture.

Action: The model's neural weights may be adjusted (fine-tuned) using this updated dataset. This fine-tuning process involves running additional training cycles where the model learns from the new data, potentially altering its predictions and content generation to reflect recent information and trends, such as for example described herein.

Storing and deploying the updated model:

After fine-tuning, the updated model may be temporarily stored in a staging environment. Subsequent deployment procedures may include or involve:

i. Version control: Tagging the updated model with a new version number and metadata describing the update.

ii. Testing: Running automated tests to ensure basic functionality has not been compromised due to the update/fine tuning process.

iii. Staging deployment: Deploying the updated model to a controlled development environment where, for example it may receive simulated inputs to assess performance.

Performance Evaluation:

With the updated model in the staging environment, performance metrics may be calculated. These metrics may include, e.g., include perplexity for generative tasks, accuracy for classification tasks, and/or other metrics such as, e.g., described herein.

In some example embodiments, if the updated model shows, e.g., a higher perplexity score (or a different score metric) than the original model prior to updates, (which may indicate, e.g., that performance got worse due to the update) such a difference in score may trigger a review process, e.g., by sending an alert to a system administrator (many alert generation and/or transmission formats are known in the art and may be used in different embodiments).

Decision Making—deploy or discard:

If performance improves or remains stable or similar to the model's performance prior to the update—for example according to predefined threshold applied to calculated metrics, the updated model may then fully deployed, e.g., to a runtime environment, to replace the previous version in that environment. For example, a predetermined threshold of a difference or change of at least −0.5 in a given perplexity score may indicate improved or similar performance, and an update to an LLM resulting in such a change may result in deploying the model. Otherwise, if a difference or change in relevant scores or metrics does not meet a predetermined threshold or condition (e.g., given the previous example: a change of +0.5 in a given perplexity score), the updated model may be discarded or deleted, and the system may revert to or retain the original model for production tasks, e.g., in the runtime environment.

In some embodiments, a continuous integration/continuous deployment (CI/CD) pipeline or framework may be utilized as part of deploying a model. As part of this pipeline or framework automated system handles the testing, staging, and deployment phases, ensuring that updates undergo rigorous evaluation before reaching production. CI/CD pipelines may facilitate rollback procedures if an update is found to be problematic after deployment, ensuring system stability and performance continuity. Various CI/CD techniques, as well as additional or alternative model updating and/or testing and/or deployment protocols and procedures are known in the art and may be used in different embodiments of the invention.

A nonlimiting example case study: updating a news content generation model according to some embodiments of the invention:

Objective:

The goal of the update is to incorporate recent developments and linguistic trends from the news sector into the LLM, ensuring the generated content is up-to-date and resonates with current events.

Initial State:

The original model has a set of baseline metrics established through prior evaluations. For instance, its perplexity score on a standardized news article test set is 30, and its accuracy in correctly identifying or extracting topics of a given text is 85%.

Update Process:

The model is then fine-tuned with a dataset comprising recent news articles covering new topics and recent events not present in the original training set.

Evaluation Metrics Post-Update:

After fine-tuning, the model is evaluated using the same standardized test set, plus an additional set of articles from recent events.

New perplexity score: 28 (a decrease from the original, indicating improved performance).

New topic identification accuracy: 88% (an increase from the original, indicating better understanding and classification of news topics).

Decision Criteria:

Perplexity score decrease: the decrease in perplexity from 30 to 28 suggests that the updated model can predict the next word in a sequence more accurately than prior to the update, leading to more coherent and contextually relevant text generation. This improvement is significant for a content generation model, as it directly impacts the quality of output.

Accuracy increase in topic identification: The increase in accuracy for topic identification from 85% to 88% demonstrates that the model has a better grasp of the content, likely due to the incorporation of recent data. This enhancement would be particularly valuable for applications that require accurate content categorization and topical relevance.

Decision:

deploy the update: given both key metrics (perplexity and topic identification accuracy) have shown improvement, the decision would be to deploy the updated model. These metric improvements indicate that the update has successfully enhanced the model's relevance and effectiveness in generating news-related content.

Conditions/Requirements for Accepting/Rejecting an Update:

Acceptance criteria: an update might be accepted if it shows improvement (or at least parity) in critical performance metrics without introducing new problems, such as increased bias or reduced performance in secondary metrics.

Rejection criteria: an update could be rejected if it leads to worsened performance in essential metrics (or in metrics prespecified, e.g., by a system administrator) or if improvements in one area significantly degrade performance in another (e.g., an update that improves fluency but drastically reduces factual accuracy).

Additional or alternative nonlimiting examples and/or case studies for updating and/or fine-tuning and/or deploying a model according to different embodiments of the invention, and using various scores and/or metrics and/or protocols and procedures such as, e.g., described herein may be realized.

Figure 6:
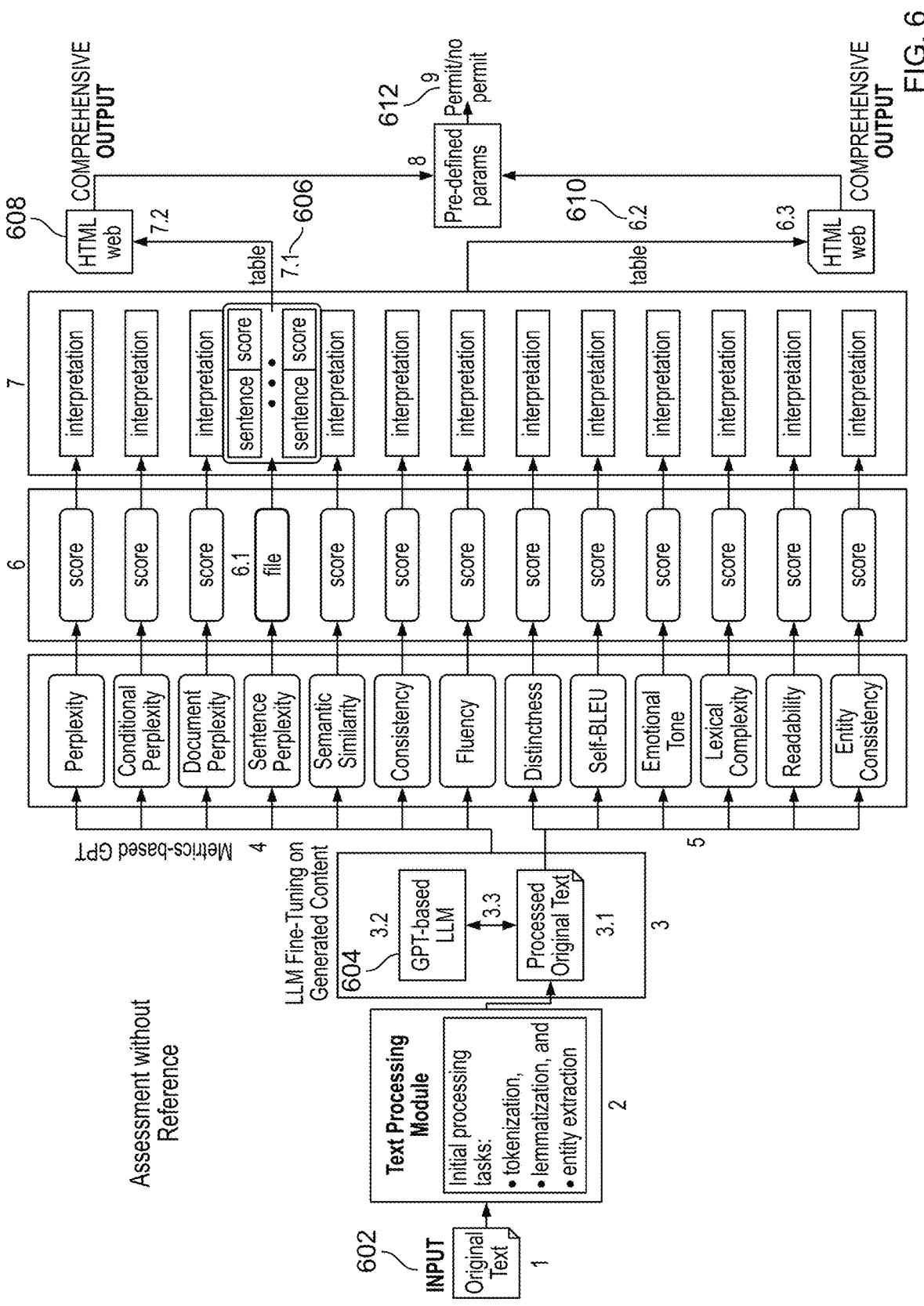
FIG. 6 shows an example workflow for evaluating texts according to some embodiments of the invention.

FIG. 6 shows an example workflow for evaluating texts according to some embodiments of the invention. Different workflow steps and/or components may include or involve, for example:

Element 1 602: receiving an input text (which may be referred to as an "original text" and which may or may not be AI generated).

Element 2: standard pre-processing step (such as for example text tokenization, lemmatization, and the like—e.g., according to various protocols and procedures known in the relevant arts).

Element 3: ChatGPT-like LLM (or additional or alternative LLM) may evaluate or assess the input text—for example based on the protocols and procedures described herein.

Element 3.1 may be or may correspond to a processed textual input (which may for example be received after element 2).

Element 3.2 604 may be or may correspond to a GPT-based LLM (or a different LLM, such as for example, Claude, BLOOM, and the like).

Element 3.3: may be or may correspond to training and/or fine-tuning the LLM to adjust more to the content of input text, its style, jargon, terminology, domain, topic, and the like—such as for example described herein.

Element 4: metrics that use LLM GPT-based architecture may be calculated.

Element 5: remaining (e.g., model independent) metrics may be calculated.

Element 6: calculated metrics may be provided, for example, as scores and their interpretation, in a dedicated data structure (such as for example a table, as demonstrated herein).

Element 6.1: In some example embodiments, calculated metrics comprise a perplexity table, which include a score per each sentence in the input text (such as for example perplexity table 502), which may be provided, e.g., in element 7.1 606, including a list of sentences and a list of their perplexity scores such as for example described herein. In some embodiments, the table may uploaded to a web page (element 7.2 608) which may for example allow a subject matter expert (SME), analyst, system administrator, or user to easily and conveniently analyze the results.

1. Element 6.2 610: some example embodiments may include creating an assessment table, the assessment table comprising one or more of the calculated metrics and one or more interpretations of one or more of the metrics. Some example embodiments may include or involve uploading the assessment table to a web page. For example a plurality of metrics and/or scores may form a table (including, for example scores or metrics additional or alternative to sentence perplexity scores), including scores and interpretations such as for example described herein—and which may be uploaded to a separate web page (element 6.3)—which may be for example the same web page of (element 7.2) or a separate and distinct web page—where it may be displayed and analyzed.

Element 8: the SME may pre-define or provide a plurality conditioned or criteria, as well as a plurality of accepted levels or thresholds for the calculated metrics (which may for example correspond to features or levels or quality and precision required from the text).

Element 9 612: some example embodiments may include determining, based on one or more of the calculated metrics, whether to accept or reject the input text. For example if calculated metrics or results meet the requirement of the pre-defined conditions, then the input text may be 'allowed', 'approved' or 'permitted', and may be further processed and/or used (it may, e.g., be sent to a client, sent to further aggregations or calculations, to further analysis—and for example a data transfer associated with the text may be permitted and be executed such as for example described herein). Otherwise, the text may be rejected or dismissed (and, for example, a data transfer associated with the text may be prevented or canceled—see further discussion herein).

Additional or alternative steps and/or workflows for evaluating texts and performing automated computerized actions based on text evaluations may be included and/or used in different embodiments of the invention.

Some embodiments of the invention may execute a plurality of computer processes based on, e.g., accepting or rejecting an input text such as for example described herein. For example, some example embodiments may include performing an exchange of data between remotely connected computer devices based on the determining to accept or reject the text: some embodiments may for example perform an exchange of data associated with the text over a data or communication network—which may for example correspond to sending or transmitting the input text, via a data or communication network, to a remote computing device physically separate from the processor used by embodiments of the invention. In some embodiments, the remote computing device may automatically execute a plurality of computer actions, such as for example processing the received text, and/or executing computer processes or tasks based on the received text (which may for example include computer instructions and/or requests and commands, for example in an appropriate computer programming language). Additional or alternative automated computer actions performed based on evaluations of texts may be included and/or used in different embodiments.

Figure 7:
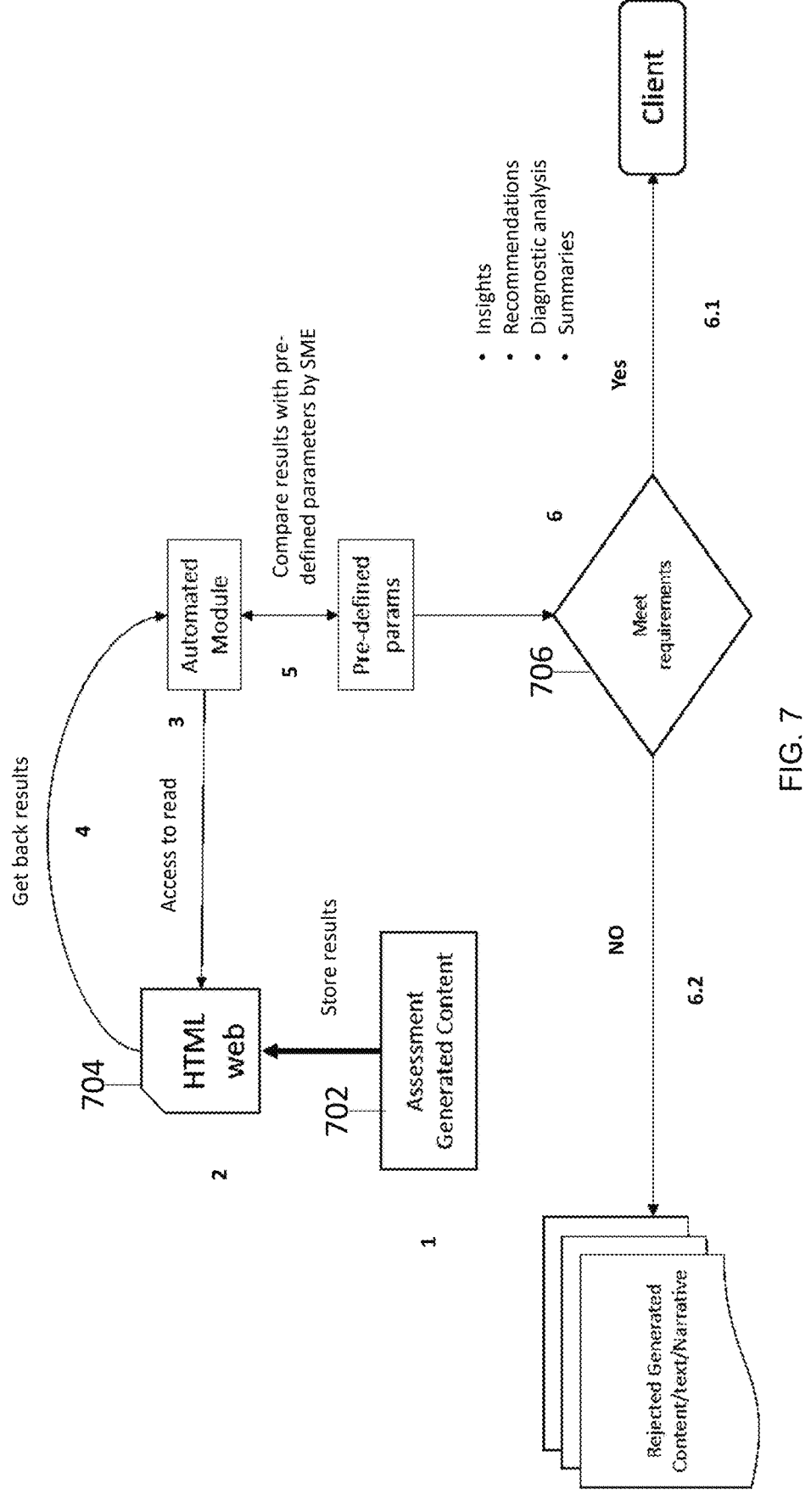
FIG. 7 shows an example automated text evaluation and distribution workflow according to some embodiments of the invention.

FIG. 7 shows an example automated text evaluation and distribution workflow according to some embodiments of the invention.

Different workflow steps and/or components may include or involve, for example:

Element (1) 702: embodiments may receive and assess, or evaluate, a text input, for example according to the various protocols and procedures described herein.

Element (2) 704: evaluation results (such as for example calculated metrics as well as interpretations, or insights, recommendations, summaries, and the like) may then be uploaded to the web (e.g., to one or more web pages).

Element (3): embodiments may (e.g., using a dedicated, automated module) access the web page and read calculated results (4).

Element (5): some example embodiments may include determining, based on one or more of the calculated metrics, whether to accept or reject the input text. For example, embodiments may compare fetched or gathered results with the pre-defined parameters or thresholds, e.g., according to a plurality of requirements, conditions and/or criteria predefined by an SME.

Element (6) 706: embodiments may check if results meet the predefined requirements.

Element (6.1): if results meet the requirements, the input text may be allowed (and, e.g., be sent to a client; a data transfer corresponding to the text may be enabled or performed)

Element (6.2): otherwise, the text may be rejected (and may not be sent, a data transfer may be prevented or disabled, and the like, such as for example described herein). In some embodiments, the rejected text may be stored in a database describing or including all rejected documents.

Additional or alternative workflow steps and/or components may be used in automated text evaluation and distribution according to different embodiments of the invention.

Figure 8:
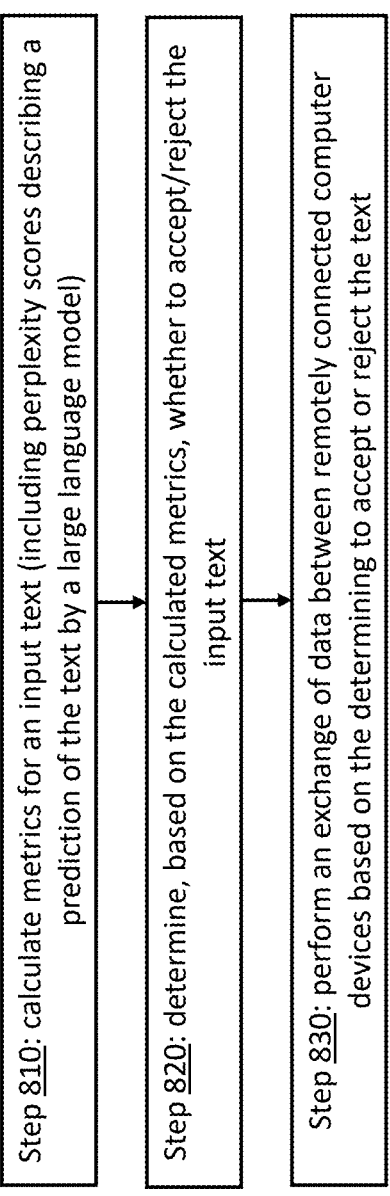
FIG. 8 shows an example method for automatically evaluating computer generated content according to some embodiments of the invention.

FIG. 8 shows an example method for automatically evaluating computer generated content according to some embodiments of the invention. In step 810, embodiments may calculate a plurality of metrics for an input text, where the metrics include one or more perplexity scores describing a prediction of the input text by a large language model (LLM). Embodiments may determine, based on the calculated metrics, whether to accept or reject the input text (step 820). Embodiments may perform an exchange of data between remotely connected computer devices based on the determining to accept or reject the text (step 830). Additional or alternative operations and/or protocols may be realized and used in different embodiments of the invention.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic)

quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized method of automatically evaluating computer generated content, the method comprising, using a computer processor:
  calculating a plurality of metrics for an input text, the plurality of metrics comprising one or more perplexity scores, the one or more perplexity scores describing a prediction of the input text by a large language model (LLM);
  determining, based on one or more of the calculated plurality of metrics, whether to accept or reject the input text; and
  performing an exchange of data between remotely connected computer devices based on the determining to accept or reject the input text.

2. The method of claim 1, wherein the one or more perplexity scores describe predicting of one or more individual sentences by the LLM, and wherein one or more of the calculated plurality of metrics comprises a perplexity table, the perplexity table describing the one or more individual sentences.

3. The method of claim 1, wherein the plurality of metrics include at least one of: a text sentiment metric, a text diversity metric, a text readability metric, and an entity consistency metric.

4. The method of claim 1, wherein one or more of the plurality of metrics are calculated using a plurality of vector embeddings, wherein one or more of the plurality of vector embeddings describes a plurality of sentences in the input text, and wherein one or more of the plurality of vector embeddings describes a plurality of words in the input text.

5. The method of claim 1, wherein the calculating the plurality of metrics and the determining whether to accept or reject the input text are performed without relying on any information received subsequent to a receiving of the input text.

6. The method of claim 1, comprising creating an assessment table, the assessment table comprising one or more of the calculated plurality of metrics and one or more interpretations of one or more of the calculated plurality of metrics; and
  uploading the assessment table to a web page.

7. The method of claim 1, comprising deploying an update to the LLM based on the determining whether to accept or reject the input text.

8. A computerized system for automatically evaluating computer generated content, the system comprising:
  a memory,
  and a computer processor configured to:
  calculate a plurality of metrics for an input text, the plurality of metrics comprising one or more perplexity scores, the one or more perplexity scores describing a prediction of the input text by a large language model (LLM);

determine, based on one or more of the calculated plurality of metrics, whether to accept or reject the input text; and
  perform an exchange of data between remotely connected computer devices based on the determining to accept or reject the input text.

9. The computerized system of claim 8, wherein the one or more perplexity scores describe predicting of one or more individual sentences by the LLM, and wherein one or more of the calculated plurality of metrics comprises a perplexity table, the perplexity table describing the one or more individual sentences.

10. The computerized system of claim 8, wherein the plurality of metrics include at least one of: a text sentiment metric, a text diversity metric, a text readability metric, and an entity consistency metric.

11. The computerized system of claim 8, wherein one or more of the plurality of metrics are calculated using a plurality of vector embeddings, wherein one or more of the plurality of vector embeddings describes a plurality of sentences in the input text, and wherein one or more of the plurality of vector embeddings describes a plurality of words in the input text.

12. The computerized system of claim 8, wherein the calculating the plurality of metrics and the determining whether to accept or reject the input text are performed without relying on any information received subsequent to a receiving of the input text.

13. The computerized system of claim 8, wherein the processor is to create an assessment table, the assessment table comprising one or more of the calculated plurality of metrics and one or more interpretations of one or more of the calculated plurality of metrics; and
  uploading the assessment table to a web page.

14. The computerized system of claim 8, wherein the processor is to deploy an update to the LLM based on the determining whether to accept or reject the input text.

15. A computerized method of automatically evaluating an input text, the method comprising, using a computer processor:
  computing a plurality of scores for the input text, the plurality of computed scores comprising one or more perplexity metrics, the one or more perplexity metrics describing a generation of the input text by a generative artificial intelligence (GenAI) model;
  determining, based on one or more of the plurality of computed scores, whether to approve or dismiss the input text; and
  saving an update to the GenAI model based on the determining whether to approve or dismiss the input text.

16. The method of claim 15, wherein the one or more perplexity metrics describe generating of one or more individual sentences by the GenAI model, and wherein one or more of the plurality of computed scores comprises a perplexity table, the perplexity table describing the one or more individual sentences.

17. The method of claim 15, wherein the plurality of scores include at least one of: a text sentiment score, a text diversity score, a text readability score, and an entity consistency score.

18. The method of claim 15, wherein one or more of the plurality of scores are computed using a plurality of vector representations, wherein one or more of the plurality of vector representations describe a plurality of sentences in the input text, and wherein one or more of the plurality of vector representations describes a plurality of words in the input text.

19. The method of claim 15, wherein the computing the plurality of scores and the determining whether to approve or dismiss the input text are performed without relying on any data received following a receiving of the input text.

20. The method of claim 15, comprising creating an output assessment, the output assessment comprising a table, the table including one or more of the plurality of computed scores and one or more descriptions of one or more of the plurality of computed scores; and uploading the output assessment to a web page.

\* \* \* \* \*